United States Patent
Hida et al.

(10) Patent No.: US 10,315,310 B2
(45) Date of Patent: Jun. 11, 2019

(54) APPARATUS FOR HELPING SETTING OF WELDING CONDITIONS IN MULTI-PASS WELDING

(71) Applicant: Kabushiki Kaisha Kobe Seiko Sho (Kobe Steel, Ltd.), Hyogo (JP)

(72) Inventors: Masatoshi Hida, Kobe (JP); Toshihiko Nishimura, Kobe (JP); Takemasa Yamasaki, Kobe (JP); Kenji Sadahiro, Fujisawa (JP); Hyunseung Kim, Fujisawa (JP)

(73) Assignee: Kobe Steel, Ltd., Hyogo (JP)

( * ) Notice: Subject to any disclaimer, the term of this patent is extended or adjusted under 35 U.S.C. 154(b) by 197 days.

(21) Appl. No.: 15/434,410

(22) Filed: Feb. 16, 2017

(65) Prior Publication Data

US 2017/0274527 A1    Sep. 28, 2017

(30) Foreign Application Priority Data

Mar. 23, 2016  (JP) ................................. 2016-058668

(51) Int. Cl.
  B25J 9/16       (2006.01)
  G05B 19/409  (2006.01)
(52) U.S. Cl.
  CPC ............ *B25J 9/161* (2013.01); *G05B 19/409* (2013.01); *G05B 2219/45104* (2013.01); *G05B 2219/45135* (2013.01); *Y10S 901/03* (2013.01); *Y10S 901/42* (2013.01)
(58) Field of Classification Search
  CPC .................. B25J 9/161; G05B 19/409; G05B 2219/45104; G05B 2219/45135; Y10S 901/03; Y10S 901/49
  See application file for complete search history.

(56) References Cited

U.S. PATENT DOCUMENTS

| 6,107,601 | A  | * | 8/2000 | Shimogama | ......... | B23K 9/1037 |
| | | | | | | 219/130.01 |
| 6,750,428 | B2 | * | 6/2004 | Okamoto | ............... | B23K 9/095 |
| | | | | | | 219/125.1 |

(Continued)

FOREIGN PATENT DOCUMENTS

| JP | 06-126453 A | | 5/1994 |
| JP | H06126452 A | * | 5/1994 |
| JP | 2014-097517 A | | 5/2014 |

OTHER PUBLICATIONS

Translation for reference JPH06126453 (Year: 1994).*
Translation for reference JPH06126452 (Year: 1994).*

*Primary Examiner* — Rachid Bendidi

(74) *Attorney, Agent, or Firm* — Studebaker & Brackett PC

(57) ABSTRACT

When setting welding conditions of arc welding, an operator sets the shape of a material to be welded, the specifications of welding, and welding conditions using a teach pendant. An apparatus for supporting setting of welding conditions in multi-pass welding of the present invention automatically calculates the state of the bead layering cross-section including at least one of the number of bead layers, the number of passes, and the layering direction, and the state of the bead layering cross-section including at least one of the number of bead layers, the number of passes, and the layering direction, obtained by the calculation is displayed on a display section.

4 Claims, 3 Drawing Sheets

(56) References Cited

U.S. PATENT DOCUMENTS

| | | | |
|---|---|---|---|
| 6,853,881 B2 * | 2/2005 | Watanabe | B25J 9/1671 |
| | | | 219/121.63 |
| 7,720,573 B2 * | 5/2010 | Yamada | B25J 19/023 |
| | | | 700/245 |
| 8,487,213 B2 * | 7/2013 | Asai | B23K 9/0953 |
| | | | 219/124.1 |

* cited by examiner

EXAMPLE 1

EXAMPLE 2

EXAMPLE 3

APPARATUS FOR HELPING SETTING OF WELDING CONDITIONS IN MULTI-PASS WELDING

BACKGROUND OF THE INVENTION

1. Field of the Invention

The present invention relates to an apparatus for supporting setting of welding conditions in multi-pass welding.

2. Description of the Related Art

In a welding robot that automatically welds a workpiece, a tool having a welding torch or the like is attached to the tip of the welding robot (for example, articulated robot). A controller that controls the operation of such a welding robot is connected to a teach pendant (operating device) for operating the welding robot.

The teach pendant is a portable operating device. An operator actually causes the welding robot to operate mainly by manual operation, and thereby teaches the path of travel, position, and the like of the tool relative to the workpiece. In addition, welding conditions are also taught through the teach pendant. The teach pendant is provided with a display section, and various pieces of information are displayed on the display section.

For example, Japanese Unexamined Patent Application Publication No. 6-126453 discloses a technique of displaying welding conditions, heat input, bead shape, and so forth on the display section of the teach pendant.

That is, Japanese Unexamined Patent Application Publication No. 6-126453 discloses a method for automatically selecting welding conditions in which, when selecting welding conditions of arc welding, welding conditions are selected by command of an operator through an operating section, the material to be welded, the groove shape, the welding position, the welding method, and the welding material that are necessary pieces of information are set, arithmetic processing is performed in a control section by command of the operator based on information of a storage section that temporarily stores welding data and processing results, and based on the above set conditions, and welding conditions, heat input, bead shape, arc phenomenon, and bead layering view are output to a display section or a recording section as needed.

Various welding conditions are set through the teach pendant. For example, the shape of the base material, the joint shape, the welding position (the angle of the base material), and the welding target position (torch target position) are input using input keys provided on the teach pendant. Particularly in the case of multi-pass welding, various items are input and set, and therefore input errors may occur.

However, the display section for checking input numerical values conventionally displays only input numbers, and it is difficult to find input errors by the conventional display method.

Japanese Unexamined Patent Application Publication No. 6-126453 discloses no useful solution to such a problem. Japanese Unexamined Patent Application Publication No. 6-126453 only describes "welding conditions, heat input, bead shape, arc phenomenon, and bead layering view are output to a display section or a recording section as needed," and does not disclose any specific way of display.

SUMMARY OF THE INVENTION

In view of the above problem, it is an object of the present invention to provide an apparatus for supporting setting of welding conditions in multi-pass welding that can calculate a bead layering view after welding based on welding conditions input using input keys provided on a teach pendant, can graphically display not only the calculated bead layering view but also all given conditions such as the shape of the base material, the joint shape, the welding position, and the welding target position, and supports an operator in checking.

To attain the above object, the following technical measures are taken in the present invention. In an aspect of the present invention, an apparatus for supporting setting of welding conditions in multi-pass welding by a welding robot includes a control section that controls the welding robot, and a teach pendant that is connected to the control section and that instructs the welding robot to operate. The teach pendant has an input section for setting operation instruction information and a display section capable of graphic display. The teach pendant is configured such that the shape of a material to be welded and welding conditions as the operation instruction information can be set. The apparatus for supporting setting of welding conditions automatically calculates the state of the bead layering cross-section including at least one of the number of bead layers, the number of passes, and the layering direction. The display section of the teach pendant displays the state of the bead layering cross-section obtained by the calculation, together with the material to be welded and the groove shape of the material to be welded.

The teach pendant is preferably configured such that the specifications of welding can be set.

The display section is preferably configured to be able to display the torch target position on the bead layering cross-section displayed on the display section.

According to the technique of the present invention, not only the calculated bead layering view but also a plurality of conditions such as the shape of the base material, the joint shape, the welding position, and the welding target position, can be graphically displayed on the display section of the teach pendant, and an operator can be supported in checking.

DESCRIPTION OF THE PREFERRED EMBODIMENTS

A welding robot 1 (hereinafter simply referred to as a robot system 1) according to an embodiment of the present invention will be described below with reference to the drawings.

First, the overall configuration of the robot system according o this embodiment will be described with reference to FIG. 1.

Figure 1:
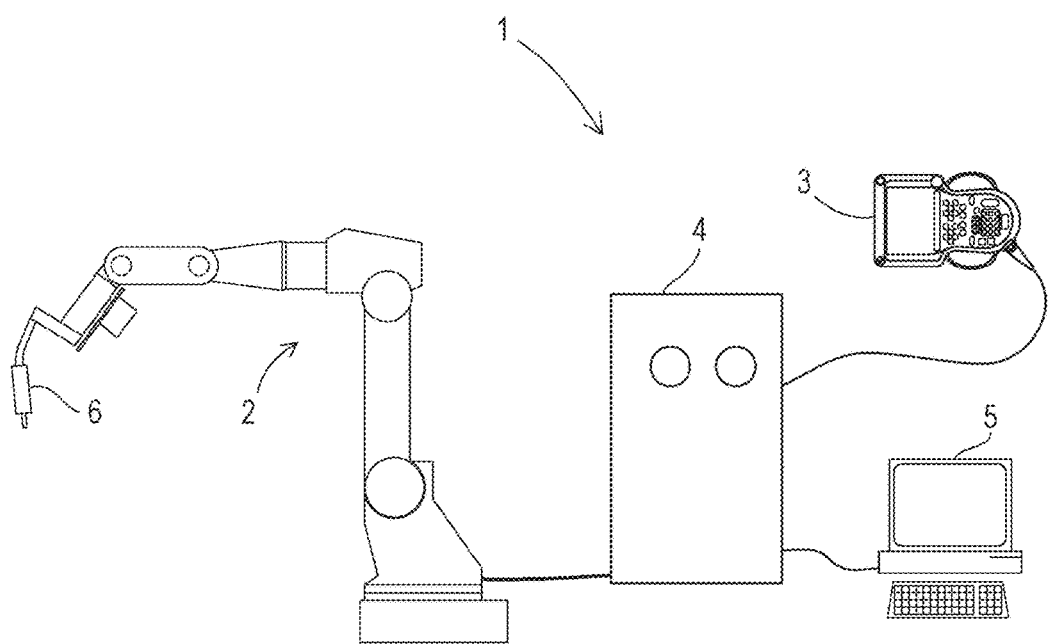
FIG. 1 is a schematic configuration diagram of a welding robot system including a teach pendant.

As shown in FIG. 1, the robot system 1 includes a welding robot 2, a control device 4 having a teach pendant 3, and a personal computer 5.

The welding robot 2 is, for example, a vertical articulated six-axis industrial robot. A welding tool 6 composed of a welding torch or the like is attached to a flange provided at the tip of the welding robot 2. The welding robot 2 may also be mounted on a slider (not shown) on which the welding robot 2 is mounted and that moves the welding robot 2.

The control device 4 outputs an operation instruction to the welding robot 2 based on operation instruction information that is output from the teach pendant 3 and that instructs the operation direction of the welding robot 2, and outputs an operation instruction to the welding robot 2 in accordance with a preliminarily taught program (teaching program), thereby controlling the operation of the welding robot 2. The operation instruction information is set by operating operation buttons provided on the teach pendant 3.

The teaching program may be created by using the teach pendant 3 connected to the control device 4 or may be created by using an offline teaching system using the personal computer 5. In either case, the teaching program is preliminarily created before the welding robot 2 actually performs a welding operation, and instructs the welding robot 2 on how to operate during the welding work. The teaching program created offline using the personal computer 5 is delivered to the control device 4 via, for example, a medium magnetically or electrically storing data, or is transferred to the control device 4 via data communication.

The personal computer 5, that is, an offline teaching system, includes a display capable of graphical display, as a display device, and a keyboard and a mouse as input devices. Moreover, the personal computer 5 is provided with a reading device or a communication device for loading CAD information of a workpiece.

As described above, in the robot system 1 according to this embodiment, a teaching program is created using the teach pendant 3 or the personal computer 5. The creation of this teaching program is referred to as teaching work. Not only during teaching work but also when operating the welding robot 2, an operator M holding the teach pendant 3 performs work while standing outside the operating range of the welding tool 6.

Various welding conditions are set through the teach pendant 3. For example, the shape of the base material, the joint shape, the welding position (the angle of the base material), and the welding target position (torch target position) are input using input keys provided on the teach pendant 3.

Specifically, the operator inputs, through the teach pendant 3, the shape of the material to be welded such as "member, base material, groove shape, welding position," welding specifications such as "welding method, welding material," and welding conditions such as "welding current, speed, weaving information (width, reference plane, pitch), torch target position and angle." Particularly in the case of multi-pass welding. welding conditions need to be input for each layer, and various items are input and set. Therefore, an inexperienced operator is prone to making input errors.

However, in the apparatus for supporting setting of welding conditions in multi-pass welding of the present invention, a bead layering view after welding is calculated in the control device 4 or a calculator in the teach pendant 3 based on welding conditions input through the teach pendant 3. The calculated bead layering view is immediately displayed on the display section 8 of the teach pendant 8. The bead layering view displayed on the display section 8 includes the number of bead layers, the number of passes, and the layering direction. Further, not only the bead layering state but all conditions, such as the shape of the base material, joint shape, welding position, and torch target position, are displayed on the display section 8 visually at the same time. The operator can thereby visually determine whether or not the input welding conditions are correct, and is supported in checking the input welding conditions, The above technique will be described in detail.

Figure 2:
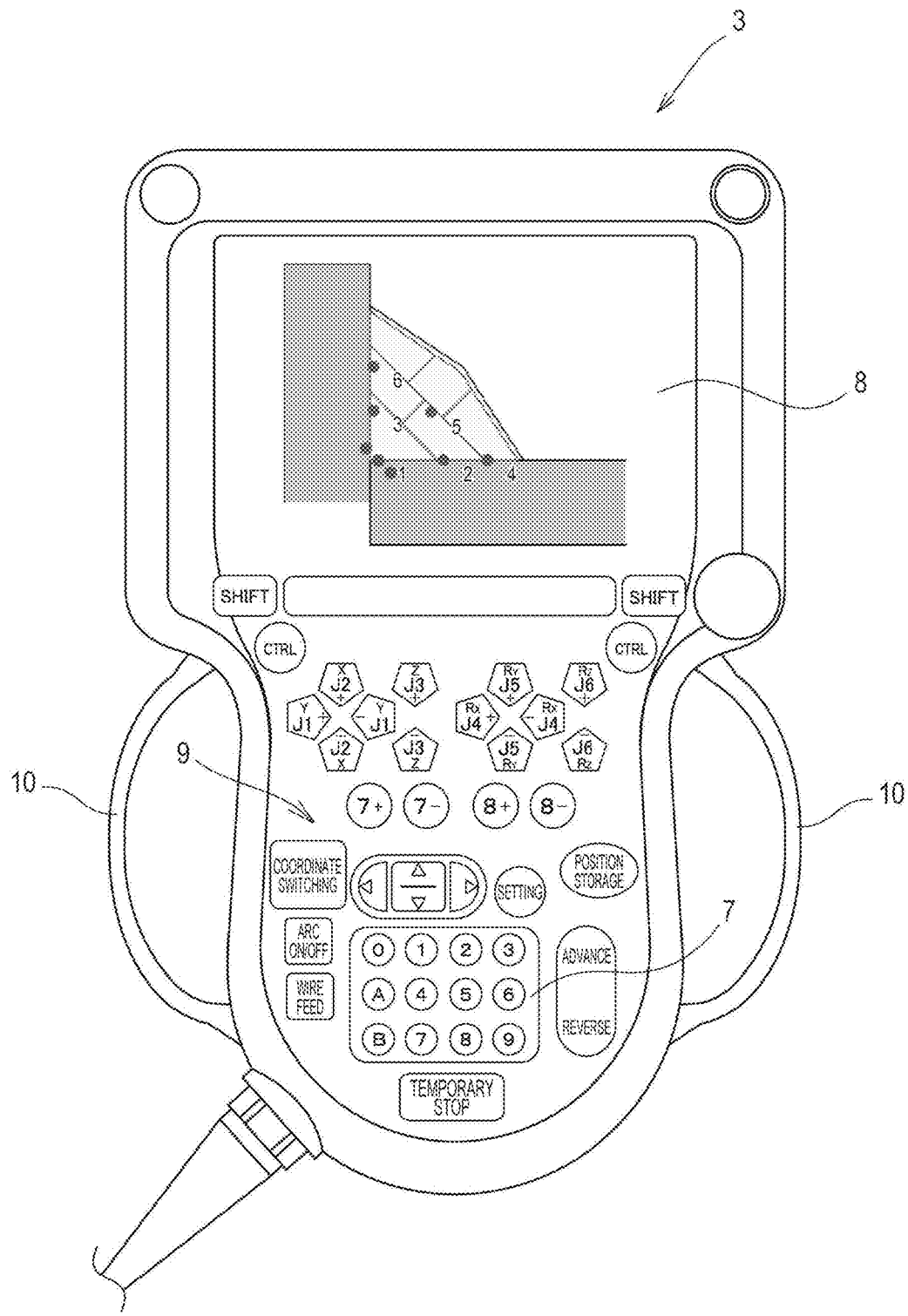
FIG. 2 shows the operation surface of the teach pendant.

First, as shown in FIG. 2, the teach pendant 3 is provided with a display section 8 on which, for example, information on the operation of the welding robot 2 and teaching operation is displayed. Below the display section 8 in the figure, there are disposed operation buttons 9 for setting operation instruction information to the welding robot 2 and for setting teaching operation, and a numeric keypad 7 for inputting numerical values.

The operation buttons 9 include an arc on/off button that is a switch for generating an electric arc at the tip of a wire of the welding tool 6, a wire feed button for feeding a wire to the welding tool 6, and a position storage button for storing the portion of the welding robot 2 in the teaching operation or the like.

In the housing of the teach pendant 3, handles (grip sections 10) to be used by the operator for holding the teach pendant 3 are provided at the left and right sides of the side where the operation surface is provided, While facing the operation surface, the operator holds the teach pendant 3 by gripping the right handle 10 with their right hand and the left handle 10 with their left hand.

The welding of medium-thick plates (medium-thick steel plates) differs from. the welding of thin steel plates in the following respects:
  (1) multi-pass welding, (2) the angle of groove varies widely and layering display based on the accurate groove shape and angle is necessary (3) display of the layering direction according to the welding position and groove state is necessary and (4) the layering direction often needs to be changed in the middle of welding.

The groove and joint shapes described in textbooks on welding are typical ones. In the case of the welding of actual thick plates, the intersection angle between the member and the base material is often an angle other than a right angle, the whole is often inclined, and the joint and groove shapes vary widely.

These shapes need to be efficiently displayed. In the present invention, by combining typical base material shapes and member shapes, 30 or more meaningful patterns of joint and groove shapes of medium-thick plates can be described, and, by specifying the intersection angle of the member relative to the base material, all cases of oblique arrangement can be described. By such a function, in the present invention, a more real workpiece shape is efficiently described. These displays (visual displays) are displayed on the display section 8 of the teach pendant 3.

In multi-pass welding, welding at the same height in the layering direction is referred to as laver, and the number of times of welding is referred to as pass.

The layering of heads needs to be displayed on the display section 8 of the teach pendant 3 intelligibly to the operator. In multi-pass welding, the target position is changed for each welding pass. In order to display welding passes in the same layer distinctively from the other passes, when the target position is within a certain range relative to the height in the layering direction, the welding pass is determined to be in the same layer.

In the case where there is a step, in T joint welding, in single bevel welding, and so forth, welds filling a groove may be layered horizontally, and then layering angled along the finished shape may be performed. According to the change of welding conditions such as switching of the weaving reference plane, the layering direction is automatically switched. Layering display of beads is also performed on the display section 8 of the teach pendant 3 so that the operator can learn this.

Although the operator of the welding robot 2 inputs various command values as welding conditions through the teach pendant 3, what the operator wants to know is the result of welding performed under the input conditions.

So, in the present invention, (1) when the operator of the welding robot 2 sets or changes the welding current, voltage, speed, and so forth, "the bead shape" and "the deposited metal (bead) shape" on the cross-sectional view of the welding joint are displayed graphically and two-dimensionally or three-dimensionally and, (2) when the operator of the welding robot 2 sets or changes the torch target position and the torch angle, "the target position and the torch angle" on the cross-sectional view of the welding joint are displayed graphically and two-dimensionally or three-dimensionally and the operator can thereby set or change conditions more easily and reliably For example, values of the torch target position need to be set in the horizontal and vertical directions. Even if the shapes of the joint and the groove are the same, setting values of appropriate target position shift vary depending on the welding position. Condition setting needs to be performed very carefully. It is of course checked whether or not the target position is as intended. Checking is performed not only on numerical values but using graphical display, and input errors can thereby be prevented.

EXAMPLES

Figure 3:
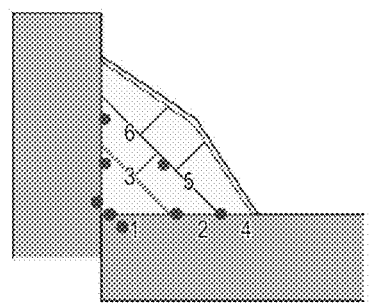
FIG. 3 shows examples of bead layering views displayed on the teach pendant.
Figure 3:
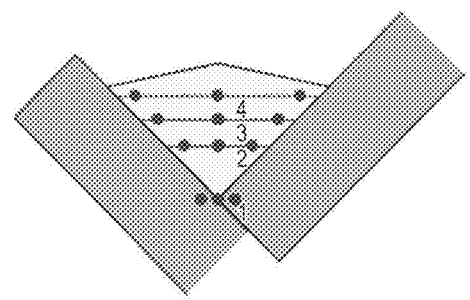
Figure 3:
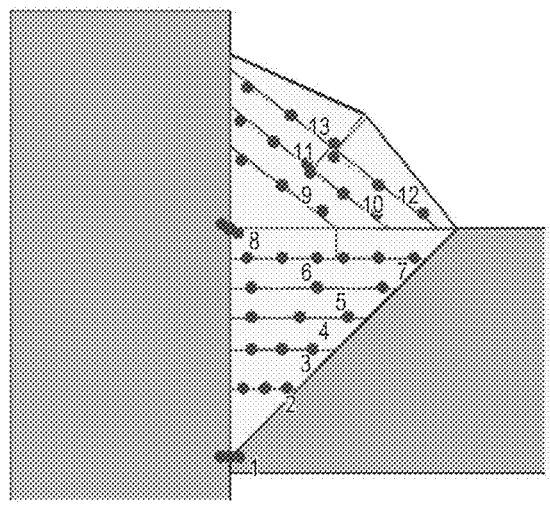

FIG. 3 shows examples (Examples 1 to 3) of screens displayed on the display section 8 of the teach pendant 3.

In multi-pass welding, passes at the same height are referred to as layer. For example, in Example 1 of FIG. 3, passes 2 to 3 are referred to as the second layer, and passes 4 to 6 are referred to as the third layer. For the same layer, much the same conditions are often set except for the target position and the torch angle with respect to the wall. To support the operator in setting, it is necessary to determine layers and passes and to display them intelligibly.

To calculate the relationship between layers and passes, the layering height is defined as the actual layering direction while taking into account the inclination of the welding position of the welding joint is taken into account, the layering height that can be calculated from the target position in the horizontal and vertical directions is calculated, and passes whose layering heights are within a certain range are grouped as the same layer.

In these examples, the amounts of deposition in the same layer are totaled, and layered as a layer, and distributed from the target position according to the amount of deposition of each pass in the layer, and displayed in a simple shape so that even a display device having low calculation capability can display it.

Example 1

The display of Example 1 of FIG. 3 is an example in which conditions of horizontal fillet welding of a T joint are set.

As is clear from Example 1 of FIG. 3, the first layer is welded in the first pass, the second layer is welded in the second and third passes, and the third layer is welded in the fourth to sixth passes. The torch inclination angle and the layering direction are 45°. Black dots in FIG. 3 denote torch target positions in each pass.

Since various pieces of information are displayed together on the bead cross-section, the operator can intuitively and accurately check whether or not the welding conditions they input through the teach pendant 3 are correct.

Example 2

The display of Example 2 of FIG. 3 is an example in which conditions of flat fillet welding of a T joint are set. The base materials are inclined at 45° compared to Example 1, and the welding position is flat.

In Example 2, unlike Example 1, the first layer is welded in the first pass, the second layer is welded in the second pass, the third layer is welded in the third pass, and the fourth layer is welded in the fourth pass. The torch target positions in each pass also differ vastly from those in Example 1.

As described above, appropriate welding conditions of fillet welding of a T joint vary greatly depending on the angles of the base materials. The present invention is very effective in checking welding conditions in such a case.

Example 3

The display of Example 3 of FIG. 3 is an example in which conditions of single bevel welding of a T joint are set. In addition, in Example 3, the layering direction of beads is switched.

In this example, until the seventh pass, the torch faces downward and beads are layered in the horizontal direction. From the eighth pass onward, the torch angle is 45°. When performing this display, in view of the fact that the reference plane of weaving direction is switched from the horizontal to the torch direction, the display of the bead layering direction is switched based on this information. Table shows welding conditions set in Example 3, for reference.

TABLE

| Pass No. | Current | Welding speed | Voltage | Amount of target position shift | | Weaving | | | | Torch angle | |
| | | | | Horizontal direction | Vertical direction | Reference plane | Amplitude | Number of times | End stop | Inclination angle | Advance reverse angle |
| --- | --- | --- | --- | --- | --- | --- | --- | --- | --- | --- | --- |
| 1 | 280 | 36 | 31.2 | 0 | 0 | Horizontal | 2 | 120 | 0 | 0 | 0 |
| 2 | 330 | 30 | 36.3 | 3 | 5 | Horizontal | 5 | 60 | 0.2 | 0 | 0 |
| 3 | 330 | 26 | 36.3 | 4 | 8 | Horizontal | 7 | 60 | 0.2 | 0 | 0 |
| 4 | 330 | 22 | 36.3 | 6 | 11 | Horizontal | 11 | 60 | 0.1 | 0 | 0 |
| 5 | 330 | 19 | 36.3 | 8 | 15 | Horizontal | 15 | 55 | 0.1 | 0 | 0 |
| 6 | 330 | 30 | 36.3 | 5 | 18 | Horizontal | 8 | 80 | 0 | 0 | 0 |
| 7 | 330 | 30 | 36.3 | 14 | 18 | Horizontal | 8 | 80 | 0 | 0 | 0 |
| 8 | 330 | 23 | 36.3 | 0 | 26 | Torch | 2 | 120 | 0 | −10 | 0 |

TABLE-continued

| Pass No. | Current | Welding speed | Voltage | Amount of target position shift | | Weaving | | | | Torch angle | |
| | | | | Horizontal direction | Vertical direction | Reference plane | Amplitude | Number of times | End stop | Inclination angle | Advance reverse angle |
| --- | --- | --- | --- | --- | --- | --- | --- | --- | --- | --- | --- |
| 9 | 330 | 19 | 36.3 | 6 | 30 | Torch | 11 | 55 | 0.2 | −10 | 0 |
| 10 | 330 | 29 | 36.3 | 12 | 29 | Torch | 9 | 80 | 0 | −10 | 0 |
| 11 | 330 | 29 | 36.3 | 5 | 35 | Torch | 9 | 80 | 0 | −10 | 0 |
| 12 | 330 | 25 | 36.3 | 16 | 30 | Torch | 12 | 70 | 0 | −10 | 0 |
| 13 | 330 | 25 | 36.3 | 6 | 38 | Torch | 12 | 70 | 0 | −10 | 0 |

When weaving is not performed, in view of the fact that the torch inclination angle is changed halfway the layering display is switched accordingly.

The apparatus for supporting setting of welding conditions in multi-pass welding according to the present invention can graphically display not only the calculated bead layering view but also all conditions, such as the shape of the base material, the joint shape, the welding position (the angle of the base material), the welding target position, the weaving width, the weaving reference plane, the torch target position, and the torch angle, on the display section 8 of the teach pendant 3.

The apparatus for supporting setting of welding conditions in multi-pass welding according to the present invention is configured such that the shape of the material to be welded, the specifications of welding, and the contents of welding conditions set using the teach pendant can be checked based on the state of the bead layering cross-section displayed on the display section.

The disclosed embodiments are for the purposes of illustration and not limitation. For example, the bead shape may be measured for each bead layer with an image sensor or the like, and the difference between the measured shape and the planned bead shape may be displayed on the display section 8. Although the display device of this application is a teach pendant, it may be a portable device such as a mobile personal computer or a touch panel.

What is claimed is:

1. An apparatus for supporting setting of welding conditions in multi-pass welding by a welding robot, comprising:
   a control section that controls the welding robot; and
   a teach pendant that is connected to the control section and that instructs the welding robot to operate, the teach pendant having an input section for setting operation instruction information and a display section configured to graphically display,
   wherein the teach pendant is configured such that a shape of a material to be welded and welding conditions which include a welding current, voltage and speed as the operation instruction information can be input by an operator,
   the apparatus for supporting setting of welding conditions automatically calculates a state of a bead layering cross-section including at least one of a number of bead layers, a number of passes, and a layering direction based on the input by the operator, and
   the display section of the teach pendant displays the state of the bead layering cross-section obtained by the calculation, together with the material to be welded and a groove shape of the material to be welded.

2. The apparatus for supporting setting of welding conditions in multi-pass welding according to claim 1, wherein the teach pendant is configured such that the specifications of welding can be set.

3. The apparatus for supporting setting of welding conditions in multi-pass welding according to claim 1, wherein the display section is configured to be able to display the torch target position on the bead layering cross-section displayed on the display section.

4. An apparatus for supporting setting of welding conditions in multi-pass welding by a welding robot, comprising:
   a control section that controls the welding robot; and
   a teach pendant that is connected to the control section and that instructs the welding robot to operate, the teach pendant having an input section for setting operation instruction information and a display section configured to graphically display,
   wherein the teach pendant is configured such that [i] a shape of a material to be welded which includes a base material, a groove shape, and a welding position, [ii] welding specifications which include a welding method and a welding material and [iii] welding conditions which include a welding current, voltage and speed as the operation instruction information can be input by an operator,
   the apparatus for supporting setting of welding conditions automatically calculates a state of a bead layering cross-section including a number of bead layers, a number of passes, and a layering direction based on the input by the operator, and
   the display section of the teach pendant displays the state of the bead layering cross-section obtained by the calculation, together with the material to be welded and the groove shape of the material to be welded.

\* \* \* \* \*